Figure 5:
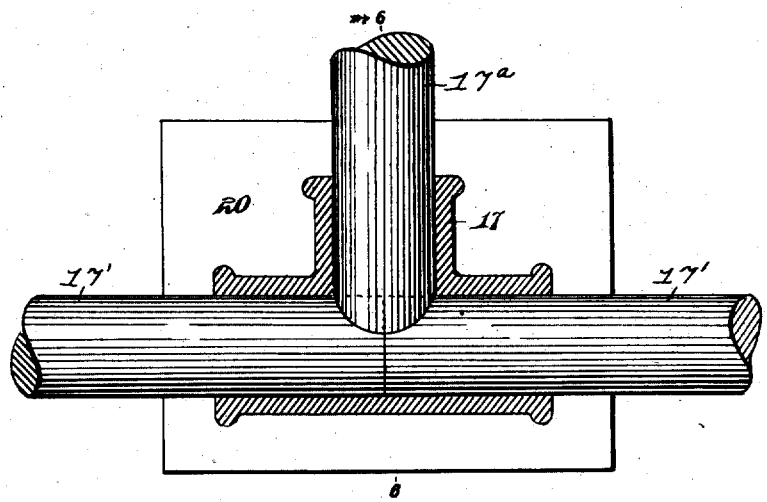

No. 689,204. Patented Dec. 17, 1901.
J. B. LARKIN.
MANUFACTURE OF HOLLOW METAL BODIES.
(Application filed Dec. 5, 1900.)
(No Model.) 4 Sheets—Sheet 1.
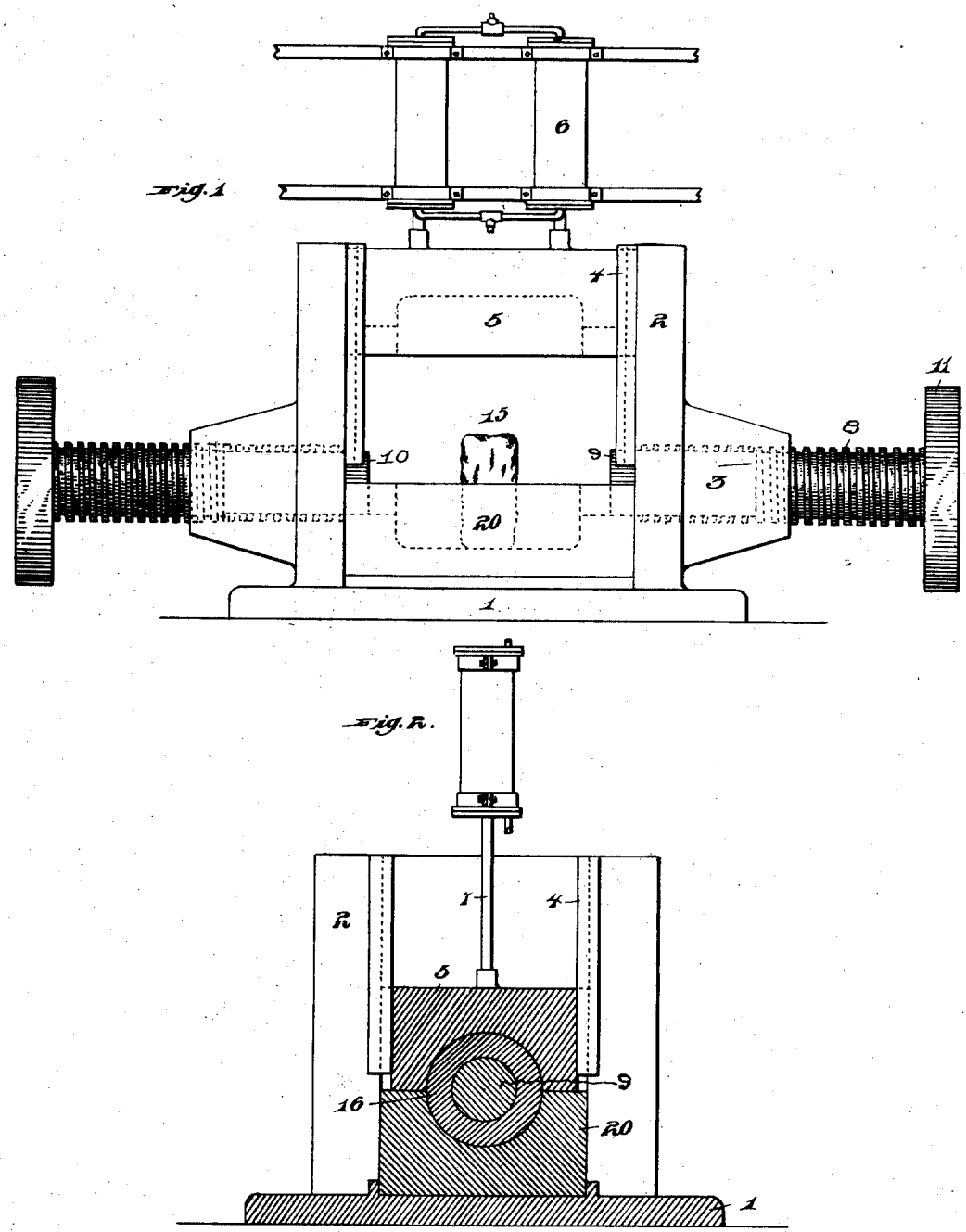

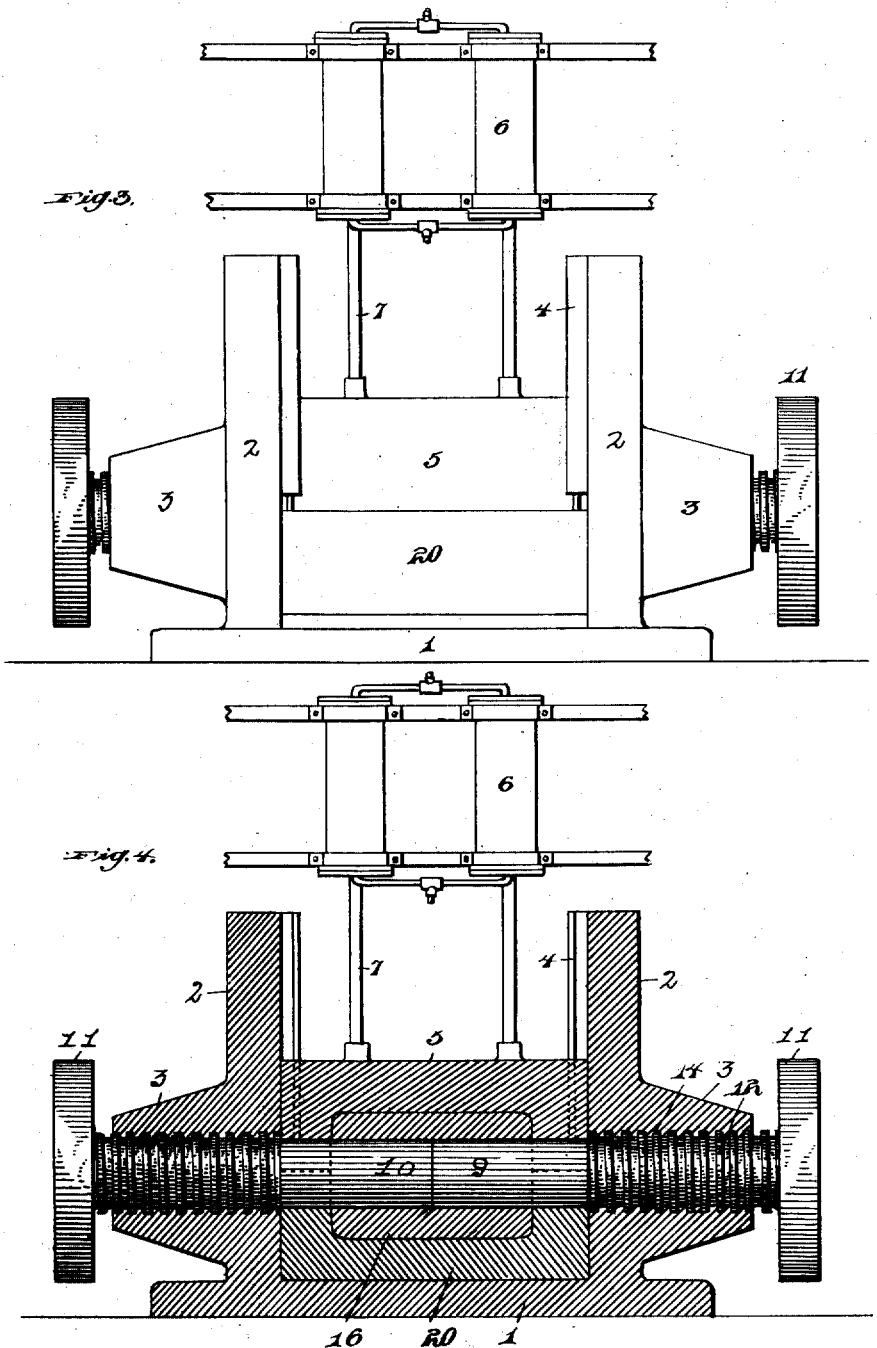

No. 689,204. Patented Dec. 17, 1901.
J. B. LARKIN.
MANUFACTURE OF HOLLOW METAL BODIES.
(Application filed Dec. 5, 1900.)
(No Model.) 4 Sheets—Sheet 3.

Witnesses:
Inventor
J. B. Larkin.
By
Attys.

No. 689,204. Patented Dec. 17, 1901.
J. B. LARKIN.
MANUFACTURE OF HOLLOW METAL BODIES.
(Application filed Dec. 5, 1900.)

(No Model.) 4 Sheets—Sheet 4.

Witnesses:
J. P. Appleman
E. E. Potter

Inventor
J. B. Larkin.
By
H. E. Everett & Co.
Attys.

THE NORRIS PETERS CO., PHOTO-LITHO., WASHINGTON, D. C.

UNITED STATES PATENT OFFICE.

JOHN B. LARKIN, OF PITTSBURG, PENNSYLVANIA.

MANUFACTURE OF HOLLOW METAL BODIES.

SPECIFICATION forming part of Letters Patent No. 689,204, dated December 17, 1901.

Application filed December 5, 1900. Serial No. 38,788. (No model.)

*To all whom it may concern:*

Be it known that I, JOHN B. LARKIN, a citizen of the United States of America, residing at Pittsburg, in the county of Allegheny and State of Pennsylvania, have invented certain new and useful Improvements in the Manufacture of Hollow Metal Bodies, of which the following is a specification, reference being had therein to the accompanying drawings.

This invention relates in general to the manufacture of hollow metal bodies, and more especially to the method of manufacturing collars, couplings, sockets, unions, sleeves, elbows, T's, and pipe-fittings in a closed mold of two or more parts and through the walls of which two or more mandrels are introduced, as hereinafter described.

The herein-described invention has for its object to complete within a closed mold, through the wall of which two or more mandrels are introduced, a coupling with either a smooth or threaded bore in a single operation and accomplish this operation in one-half the time usually required in other methods relating to this art.

The invention has for its further object the reduction of metal in a plastic state within the mold and its displacement and distribution by mandrels operated from the outside of and through the openings in the walls of the mold and against a piece of metal or ingot placed in the mold between the ends of the mandrels, thus not only saving time, but preventing the overheating of the mandrels and limiting their expansion, which is a very important matter where the interior size of the article is essential.

Another important feature of my invention is the displacement of the metal and its distribution from two or more points of its surface by pressure of the inwardly-traveling mandrels against it, only one-half the distance being required to accomplish the result, thereby preventing the vibration incident to the use of long unsupported mandrels and obtaining a further advantage of securing a uniform outer wall when the article is finished.

The process consists in forming a coupling, pipe, sleeve, collar, or like union from plastic metal which is displaced within a closed mold by pressure of oppositely-moving mandrels, so that the plastic metal is reduced and distributed under pressure to different points within the mold.

The invention further consists in providing removable mandrels adapted to be inserted in the mold and held stationary during the operation of the traveling mandrels, thereby forcing the metal within the mold into one or more areas, as the case may be, for the manufacture of T-couplings, elbows, four-way fittings, and the like.

In describing the invention in detail reference is had to the accompanying drawings, forming a part of this specification, wherein like numerals of reference indicate corresponding parts throughout the several views, and in which—

Figure 6:
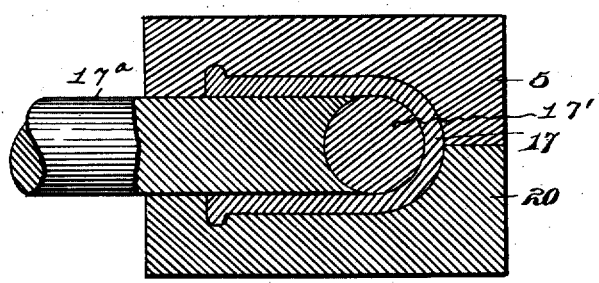
Figure 7:
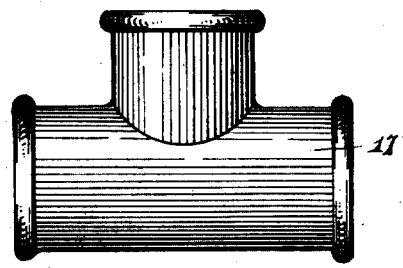
Figure 8:
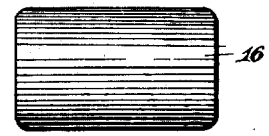
Figure 9:
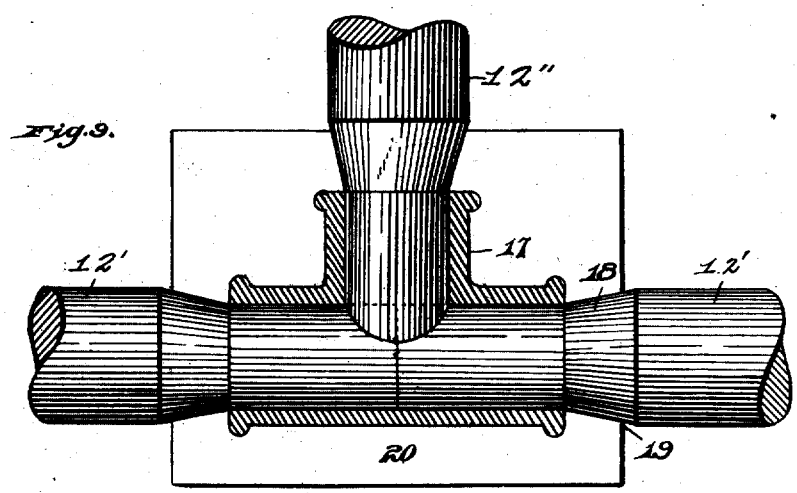
Figure 10:
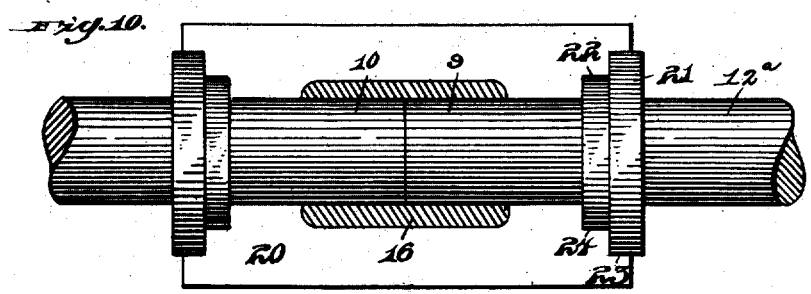
Figure 11:
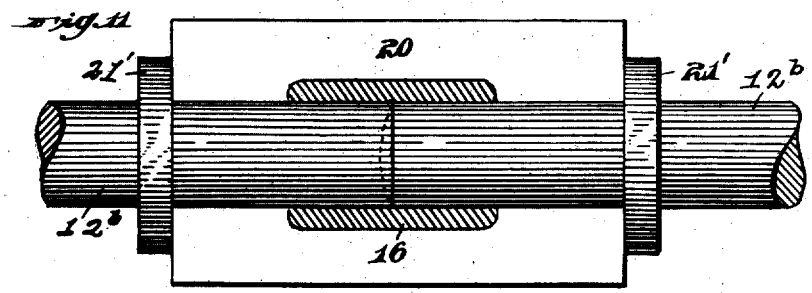
Figure 12:
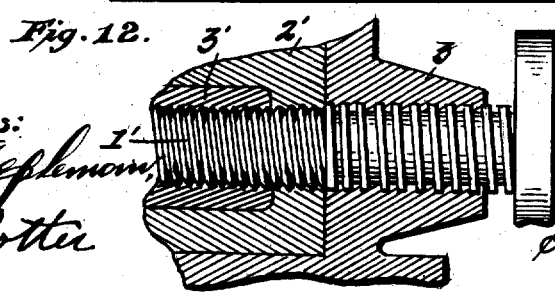

Figure 1 is a front elevation of a form of apparatus which I may employ in the practice of the invention, showing the upper section of the mold elevated. Fig. 2 is a transverse vertical sectional view thereof, the molds being closed. Fig. 3 is a side elevation showing the mold in a closed position. Fig. 4 is a vertical longitudinal sectional view thereof. Fig. 5 is an enlarged view of the mold and mandrels, showing the method of manufacturing the T-couplings. Fig. 6 is a vertical sectional view taken on the line 6 6 of Fig. 5 in the direction of the arrow. Fig. 7 is a side elevation of the finished article or T-coupling. Fig. 8 is a side view of the sleeve or union. Fig. 9 is a vertical sectional view similar to Fig. 5, showing more particularly the novel formation of the mandrel and method of sealing the mold. Fig. 10 is a similar sectional view showing a modified form of mandrel. Fig. 11 is a like view showing another modification of the mandrel. Fig. 12 is a sectional view of a part of a modified form of apparatus, showing a threaded mandrel for simultaneously threading the hollow body with the forming thereof.

In the drawings the reference-numeral 1 indicates a suitable base, upon which are mounted housings 2, carrying threaded necks 3, said housings 2 being provided on their inner faces with guides 4, between which the upper section of the mold operates.

The reference-numeral 6 indicates hydraulic cylinders carrying pistons 7, which are adapted to raise or lower the upper section of the mold.

The reference-numeral 8 represents the mandrels threaded in the necks 3, said mandrels being provided with the smooth-surface inwardly-projecting portions 9 10 to make a smooth-bore coupling, or with the threaded portion 1', Fig. 12, to make the threaded bore, and carry at their opposite ends pulleys 11, and also have oppositely-inclined screw-threads 12 operating in the screw-threaded openings 14 in the necks 3.

The numeral 15 indicates the ingot or blank from which the finished article is to be formed. 16 indicates the finished sleeve or coupling, and 17 the finished T-coupling.

In Fig. 9 I show the traveling mandrels 12', provided with a cone-shaped shoulder which is adapted to engage within a correspondingly-tapered opening 19, provided therefor in the lower section 20 of the mold. In Fig. 10 I show the mandrels 12$^a$, provided with collars 21 22 of different diameters and which are adapted to engage in circular recesses 23 24, provided therefor in the ends of the mold, while in Fig. 11 I show the mandrel 12$^b$, formed with a single collar 21', that is adapted to engage against the end of the mold. These views show various ways in which the mandrels may be constructed, with means to effectually close the openings in the mold through which the mandrels operate.

The operation of my improved process is as follows: We will assume that the parts are in position as shown in Fig. 1. The upper section of the mold is lowered to the closed position, the mandrels being driven in unison by a set of driven belts over the pulleys 11, thereby operating the mandrels inwardly toward the ingot or blank. As soon as the sides of the same are engaged by the mandrels the metal from the sides and center will be forced outwardly over the mandrels and will conform to the interior shape of the mold and fill the same, when the mandrels, with their ends, abut against each other. The mandrels are then operated in the reverse direction to withdraw them from the finished article, the mold opened, and the finished article withdrawn from the same.

When manufacturing T-couplings or the like having more than two passage-ways, I employ one or more supplemental mandrels in conjunction with the traveling mandrels aforedescribed. In Figs. 5 and 6 I show two main traveling mandrels 17' and a supplemental mandrel 17$^a$, and in Fig. 9 two main traveling mandrels 12' and a supplemental mandrel 12''. These three mandrels, whether of the form shown in Figs. 5 and 6 or that shown in Fig. 9, are employed to form T-couplings like that shown in detail in Fig. 7. The supplemental mandrel 12'' or 17$^a$ is preferably provided on the inner end with a concave seat, so as to fit onto the main traveling mandrels, as shown in Figs. 5, 6, and 9. The supplemental mandrel is driven or inserted into the mold to a desired position and is then preferably held stationary while the main traveling mandrels are operating against the plastic metal to displace and distribute the same within the walls of the mold. In some cases, however, it may be desirable to drive the supplemental mandrel in unison with the main traveling mandrels, which may be done by gearing the mandrels together or connecting all mandrels to the operating mechanism.

It will be noted that as the mandrels carrying the shoulders or cone-shaped portions travel into the mold they will automatically close and seal the same, thereby forcing the metal in the desired direction into the mold, and where T-couplings or fittings are made will force the metal into another area, transversely to the line of travel of the moving mandrels and around the supplemental mandrels or mandrel, as the case may be. It will be noted that instead of employing one or more supplemental mandrels for this operation I may provide one or more portable mandrels that may be quickly adjusted and removed when the operation is completed. I may also employ threaded mandrels to form interior screw-threads in the hollow bodies simultaneously with forming the same and in one operation complete the entire article.

In Fig. 12 I show a threaded mandrel 1', operating through the housing in the same manner as the smooth surface mandrels. The openings in the walls of the mold 2' to receive these threaded mandrels are threaded, and the threads of the mandrels operate in these threaded openings. The hollow body 3' is by the use of the threaded mandrels interiorly threaded simultaneously with the formation thereof within the mold.

Two great advantages thus obtained will be readily apparent, and they are, first, that the operation of welding is dispensed with, and, secondly, the fibers of the metal will be preserved and disintegration prevented, as it is well known in the art that by cutting the screw-threads in the metal the interior surfaces of the hollow bodies are marred, the enamel broken, and disintegration of the metal will follow, which will materially shorten the lifetime of the article and weaken it in any employment.

It will thus be observed that in the manufacture of hollow metal bodies, such as unions, T-couplings, and the like, in place of pouring hot liquid metal into a mold and around a core or cores I heat a piece of metal to a plastic state and while the metal is in this semiliquid condition distribute it through the manipulation and pressure of traveling mandrels, which take the place of cores. The engagement of these mandrels with the plastic ingot or blank reduces and displaces the metal contained therein, forcing this metal into the space between the mandrels and the inner walls of the mold and causing this metal to conform to this space whether the same be longitudinal to the axis of the mandrels or transverse thereto. Where a hollow body, such as a sleeve or nipple, is to be formed I need employ but two mandrels, both adapted to travel inwardly toward each other through the walls of the mold, and where it is desired to form a union or coupling having three or more ways or ports the supplemental mandrels or mandrel may be employed, and these mandrels, while being operative through the walls of the mold, are preferably held stationary during the time of the distorting or distributing of the plastic metal by traveling mandrels to force the metal into different areas within the mold and cause the same to conform to the space between the mandrels and the inner walls of the mold.

In the construction of the mandrels the parts thereof that project into the recess of the mold may be formed with threads, so that the displacement of the metal within the mold and the forcing of this metal into the space around the mandrels will cause the threads to be cut in the finished article.

The many advantages obtained by this method of manufacturing hollow bodies will be readily apparent from the foregoing description and by referring to the accompanying drawings.

It will be noted that various changes may be made in the details of construction of an apparatus for the practice of the method without departing from the general spirit of my invention.

Having thus fully described my invention, what I claim as new, and desire to secure by Letters Patent, is—

1. The herein-described method of manufacturing metal pipe-fittings with two or more passage-ways which consists in distributing plastic metal within a metal mold by metal mandrels so alined as to leave an annular space between them and the walls of the mold, the plastic metal within the mold being distributed under pressure of the mandrels into the annular space between the mandrels and the walls of the mold to form a hollow fitting having openings or passage-ways according to the number of mandrels employed.

2. The herein-described method of manufacturing hollow metal bodies such as couplings, unions, T's, and other like articles, which consists of placing within a mold, a piece of metal heated to a plastic condition and of sufficient size and quantity to form the article desired, and then crushing said plastic metal and distributing its substance to points within the mold whether on transverse, oblique or horizontal lines by mandrels traveling through the walls of the mold and operating against the plastic metal to distribute the same into the space between said mandrels and the walls of the mold, substantially as described.

3. The herein-described method of manufacturing T's, couplings, unions and like articles consisting of inserting within the walls of a mold of any desired design, a piece or ingot of metal heated to a plastic condition and in such position within the mold as to be engaged by one or more mandrels traveling inwardly against the plastic metal, and then crushing said plastic metal under pressure of the mandrels to reduce it and distribute the metal as it progresses, to any annular space formed within the mold by the contact or temporary union of the mandrels, substantially as described.

4. The herein-described method of manufacturing metal pipe-fittings with two or more passage-ways, which consists in distributing plastic metal within a mold of required design by threaded mandrels so alined as to leave a space between them and the walls of the mold, forcing the plastic metal within the mold under pressure of the mandrels into the space between the mandrels and the walls of the mold to form a hollow interiorly-threaded fitting having openings or passage-ways according to the number of mandrels employed, substantially as described.

In testimony whereof I affix my signature in the presence of two witnesses.

JOHN B. LARKIN.

Witnesses:
JOHN NOLAND,
H. C. EVERT.